United States Patent

Rohde

Patent Number: 5,959,433
Date of Patent: Sep. 28, 1999

[54] UNIVERSAL INDUCTIVE BATTERY CHARGER SYSTEM

[75] Inventor: Monty D. Rohde, Lincoln, Nebr.

[73] Assignee: Centurion Intl., Inc., Lincoln, Nebr.

[21] Appl. No.: 08/916,318

[22] Filed: Aug. 22, 1997

[51] Int. Cl.[6] ................................................. H01M 10/46
[52] U.S. Cl. ........................................................ 320/108
[58] Field of Search ...................... 320/104, 107, 320/108, 113, 115, DIG. 35, FOR 101, FOR 104; 336/DIG. 2

[56] References Cited

U.S. PATENT DOCUMENTS

| | | | |
|---|---|---|---|
| 2,415,688 | 2/1947 | Hall, Jr. ........................ | 336/DIG. 2 X |
| 2,967,267 | 1/1961 | Steinman et al. .............. | 336/DIG. 2 X |
| 3,414,796 | 12/1968 | Henquet ....................... | 320/108 |
| 4,031,449 | 6/1977 | Trombly ....................... | 320/108 |
| 4,912,396 | 3/1990 | Meadows ...................... | 320/108 |
| 5,264,776 | 11/1993 | Hulsey ......................... | 320/108 |
| 5,323,099 | 6/1994 | Bruni et al. ................... | 320/108 |
| 5,550,452 | 8/1996 | Shirai et al. ................... | 320/108 |
| 5,568,036 | 10/1996 | Hulsey et al. .................. | 320/108 |
| 5,594,317 | 1/1997 | Yeow et al. .................... | 320/108 |

FOREIGN PATENT DOCUMENTS

| | | |
|---|---|---|
| 700 574 B1 | 3/1996 | European Pat. Off. . |
| PCT/GB94/ 01068 | 12/1994 | WIPO . |

*Primary Examiner*—Edward H. Tso
*Attorney, Agent, or Firm*—Zarley, McKee, Thomte, Voorhees & Sease; Dennis L. Thomte

[57] ABSTRACT

A universal inductive battery charger is described including an inductive battery charger having a charging coil which creates magnetic flux lines when the charging coil is energized. The battery charger is adapted to charge a battery pack, through induction, when the rechargeable battery pack is placed on the battery charger. The battery pack includes a pick-up coil which will have an electrical current induced therein when the battery pack is positioned adjacent the battery charger. The battery pack includes a circuit for rectifying the induced current in the pick-up coil to charge the battery cells in the battery pack.

1 Claim, 2 Drawing Sheets

UNIVERSAL INDUCTIVE BATTERY CHARGER SYSTEM

BACKGROUND OF THE INVENTION

1. Field of the Invention

This invention relates to a battery charger system and more particularly to a universal inductive battery charger system.

2. Description of the Related Art

In the battery charger art, it is not believed that a truly universal battery charger exists. Although some companies refer to their battery chargers as being universal, the battery chargers must be customized to fit a particular battery pack. Most battery chargers have two or three different battery packs that they will charge, but they are usually for the same product or have some type of interchangeable cup to hold different packs of the same product family. The charger systems of the prior art normally are in the form of slow chargers, desktop chargers, plug-in chargers, etc., and can be rather bulky in size, and all are required if a traveler has both a laptop and a cellular telephone. Additionally, the current "universal" chargers require some specific metallic, electrical contacts to connect the battery and the charger.

SUMMARY OF THE INVENTION

An inductive battery charger is disclosed which is platform-shaped and which is provided with a charging coil in the interior thereof. When the charging coil in the battery charger is energized, the charging coil creates magnetic flux lines. A rechargeable battery pack is positioned on the battery charger in a non-direct electrical contact relationship with respect thereto. The battery pack includes a pick-up coil which will have an electrical current induced therein when the battery pack is positioned adjacent the battery charger and the battery charger is energized. The battery pack includes circuit means for rectifying the induced current in the pick-up coil to charge the battery cells in the battery pack. The circuit means includes a rectifier and a current limiting resistor so that the battery is self-regulating in terms of current and overcharge. All the functions are controlled from inside the battery pack so the charger is universal regardless of the battery application.

It is therefore a principal object of the invention to provide an improved battery charger.

Still another object of the invention is to provide a truly universal inductive battery charger system.

Still another object of the invention is to provide a battery charger system including a charger platform and a battery pack wherein the battery pack may be charged without a direct electrical contact relationship being established between the charger and the battery pack.

Still another object of the invention is to provide a universal inductive battery charger system wherein many different types of battery packs may be charged thereby.

Still another object of the invention is to provide a universal inductive battery charger system including a current-limiting resistor therein so that the battery is self-regulating in terms of current and overcharge.

These and other objects will be apparent to those skilled in the art.

DESCRIPTION OF THE PREFERRED EMBODIMENT

Figure 1:
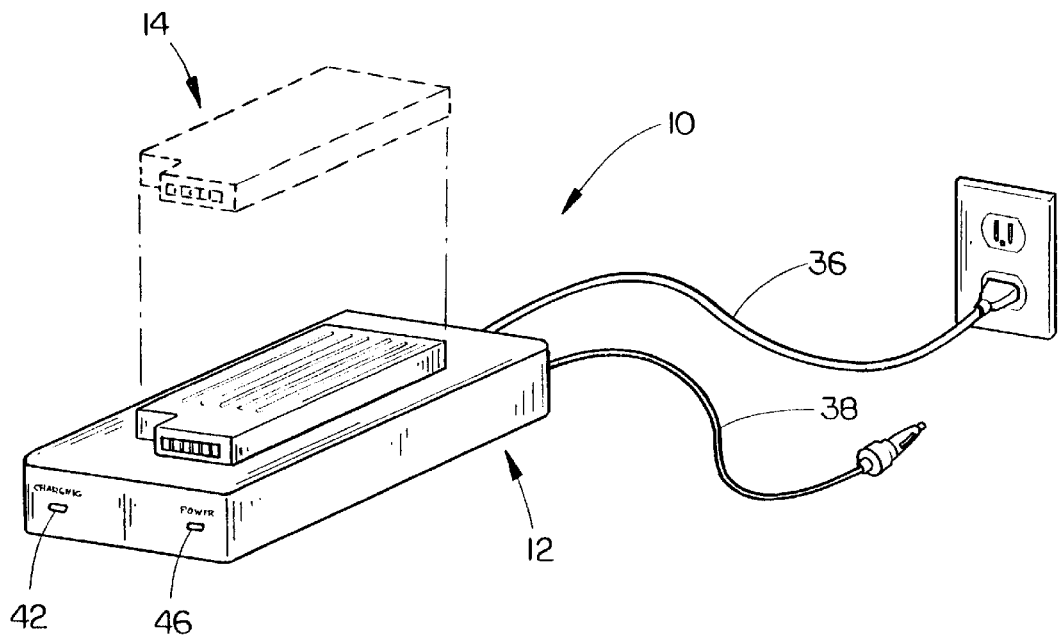
FIG. 1 is a perspective view of the universal inductive battery charger system of this invention with the broken lines illustrating the battery pack being raised from the charger platform.
Figure 2:
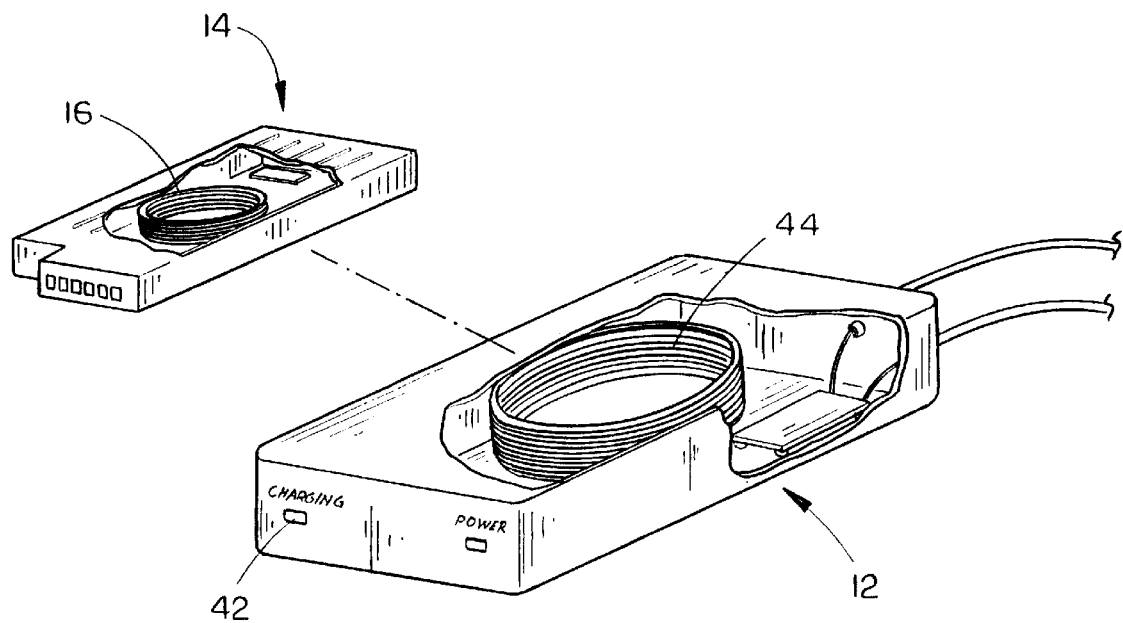
FIG. 2 is a perspective view illustrating the battery charger and the battery pack with portions thereof cut away to more fully illustrate the invention.

The universal inductive battery charger system of this invention is referred to generally by the reference numeral 10 and generally includes an inductive charger 12 and a battery pack 14. The system of this invention will accommodate various types of batteries, since a direct, metallic electrical connection is not required between the charger 12 and the battery pack 14, as will be described in more detail hereinafter.

Figure 3:
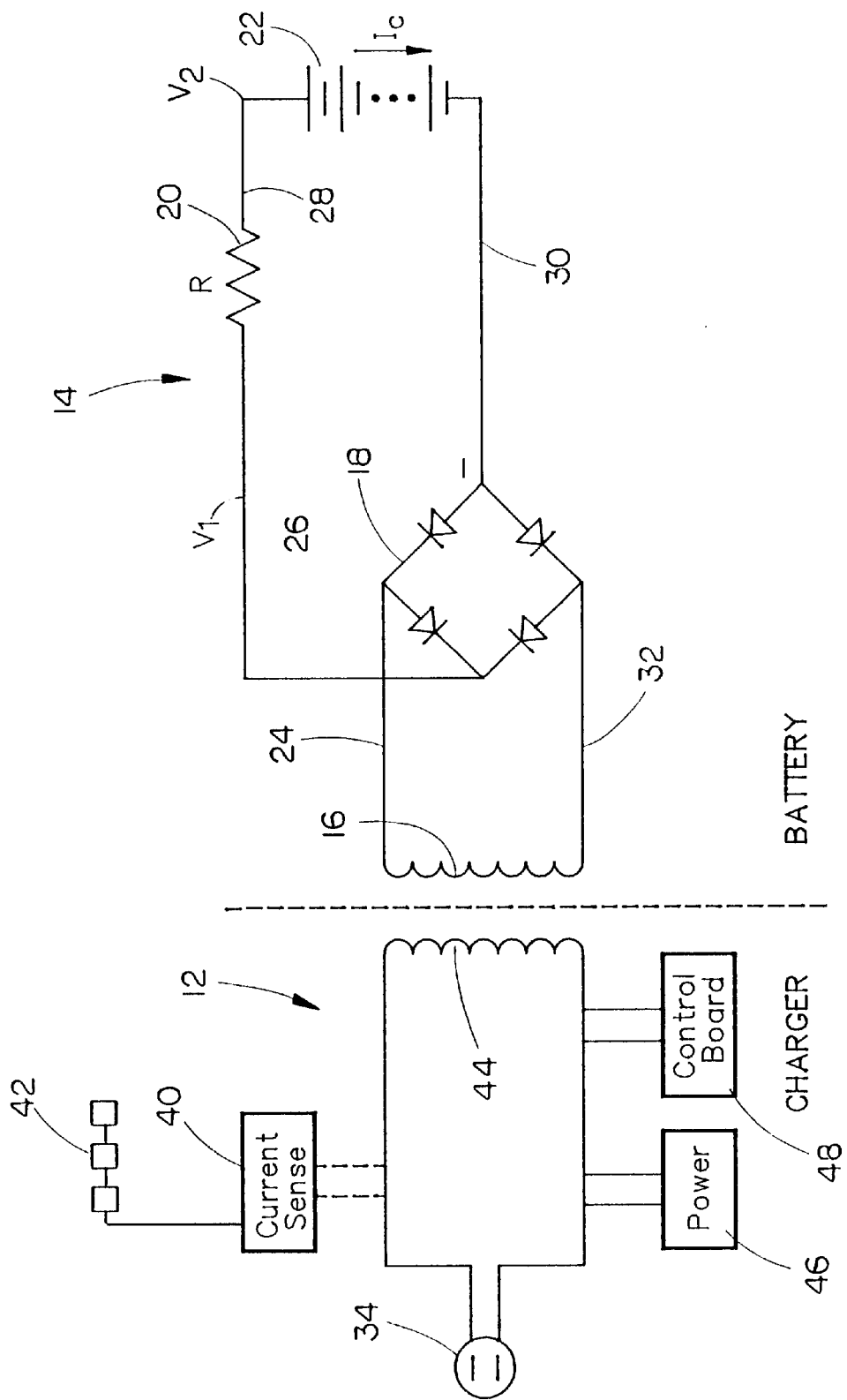
FIG. 3 is a schematic of the circuitry of this invention.

Battery pack 14 is generally conventional in design except that the battery pack 14 includes a pick-up coil 16, bridge rectifier 18, a voltage test point $V_1$, current limiting resistor 20 and the voltage test point $V_2$. As seen in FIG. 3, the numeral 22 refers to the series connection of the battery cells located within the battery pack. The battery pack may have one or more battery cells therein. The pick-up coil 16 is sized proportionately to allow it to fit inside the battery pack with minimal redesign of the battery pack and of the cells so that it will not affect the existing or conventional charging method that is used in that particular battery pack.

More specifically, one end of the pick-up coil 16 is connected to the bridge rectifier 24 with another side of the bridge rectifier 18 being connected to the resistor 20 by lead 26. As seen, voltage test point $V_1$ is imposed in the lead 26. Lead 28 electrically connects resistor 20 and the battery cells 22. Lead 30 connects the other side of the battery cells to the bridge rectifier 18. Another side of the bridge rectifier 18 is connected to the other side of pick-up coil 16 by lead 32.

Typically, the pick-up coil 16 in the battery pack 14 would be a coil of wire having X number of turns depending upon the voltage required at $V_1$. Pick-up coil 16 could be a coil of wire or it could be an etched rigid or flexible circuit board in an inductive pattern. Further, coil 16 could be comprised of strands of wire braided together, copper braid, or a molded interconnect type of device that would be a plated-on type of inductor in various configurations. The bridge rectifier 18 is comprised of independent silicone diodes, but could also be an actual bridge rectifier semi-conductor circuit that is of one-piece type design. The value of the bridge rectifier should be rated two times the maximum current expected therethrough. The size of the current limited resistor 20 is dependent upon the speed with which it is desired to charge the battery pack. Typically, resistor 20 should be of a power type resistor such as normal wire wound construction.

Battery charger 12 includes the A/C or D/C input 34, as illustrated in FIG. 3. If A/C input is required, the power cord 36 will be utilized. If D/C input is required or desired, the power cord 38 will be utilized. With respect to FIG. 3, the numeral 40 refers to a current sense board which is the sensing circuit that detects when the coil is at its maximum load, at which time it will illuminate the charger LEDs 42 so that a person will know that he/she has maximum power at the point when the LEDs 42 are the brightest. The numeral 44 refers to the charging coil of the battery charger. The numeral 46 refers to the power LED which senses when the charger is plugged into A/C or D/C power. Charger 12 also includes a control board 48 consisting of a switching power supply that will boost the voltage and/or frequency of the A/C on the primary or charger coil side.

The primary coil 44, when energized, has A/C current running through it which will create magnetic flux lines that will allow another coil in the vicinity of it to pick up some of that voltage and the voltage will be induced into the secondary coil 16 and provide a current therein. For each individual battery, the pick-up coil 16 will be sized according to the voltage required with the charging coil 44 having voltage and frequency sufficient to allow the pick-up coil 16 to be as small as possible and permit it to fit inside a battery pack. The current sense board 40 not only will illuminate the charging LEDs 42 to indicate maximum power, but it will also be able to sense if the coil is overloaded or overheated. The current sense board 40 is also able to sense whether or not a battery pack is placed on top of the charger, as opposed to some other metallic object which would induce some current as well. It is recommended that other protective devices be included in the charger such as thermal shutdowns, Polyswitches, or fuses. It is also recommended that there be a start button on the outside of the charger to ensure additional safety to initiate the charge. The housing of the charger 12 should be plastic, not metal. The housing should be comprised of a plastic material on its upper mating surface. The charger may also require some possible shielding at the outer portions thereof to prevent the induction of current into surrounding items around the charger.

As stated, when charging coil 44 is energized, it will create magnetic flux lines which will induce a current in the pick-up coil 16. After the current is rectified through the rectifier 18, a voltage is created at $V_1$ that is equivalent to approximately 1.6 volts per cell of the battery pack. This number is essentially the maximum voltage an individual Ni-CAD or Ni-MH cell will reach under charge. For a battery charger which will be used for Li-ion cells, it would be sized to 3.6, 4.2, or 4.0 volts. The current limiting resistor 20 is such that the voltage drop thereacross sets the current charge that actually goes into the battery cells. This is defined by the equation $I_c=V_1-V_2/R$. In other words, charge current $I_c$ equals the voltage of $V_1$ minus the voltage of $V_2$ divided by the resistance. As an example, FIG. 3 illustrates a six cell battery pack using 1.6 volt per cell maximum charge. When the cell is nominally discharged, it is normally one volt per cell. A six cell battery pack would be at six volts when it is ready to be charged. The point at $V_1$ would be set by the coil and the rectifier at 9.6V, which would be the 1.6 volt per cell requirement. As the battery begins to become charged, $V_2$ increases. As $V_2$ increases, the charge current begins to reduce.

When the battery reaches its peak at approximately 1.6 volts per cell per maximum under charge, the voltages $V_1$ and $V_2$ are equal. Thus, there is a zero amount of current going into the battery. As the battery cell slowly self-discharges, the voltage at $V_2$ will drop slightly and a few mA of current will flow back into the battery. The battery charger of this invention is a constant trickle charger, but it is not constant in the sense that it just keeps dumping current, since the charger only delivers current as the battery needs it, whether the battery is fully charged or not. The system of this invention is a fully regulating self-battery that will provide 100% rated capacity by fully charging the discharged battery.

Thus it can be seen that a novel universal inductive battery charger system has been provided which enables a battery charger to inductively charge a battery pack of various dimensions, sizes and configurations inasmuch as there is not a metallic electrical connection or direct connection required as in the prior art battery chargers systems. Thus, large battery packs or small battery packs may be placed on the charger 12. The only requirement is that the pick-up coil of the battery pack 14 be located sufficiently close to the charging coil to enable charging coil 44 to induce electrical current in the pick-up coil 16.

Thus it can be seen that the invention accomplishes at least all of its stated objectives.

I claim:

1. In combination:

an inductive battery charger including a charging coil which creates magnetic flux lines when said charging coil is energized;

said inductive battery charger also including a housing having a generally flat battery pack support surface, said charging coil being positioned in said housing adjacent said support surface;

a rechargeable battery pack having a generally flat surface for positioning adjacent said battery charger in a non-direct electrical contact relationship with respect thereto;

said battery pack including at least one discrete battery cell;

said battery pack also including a pick-up coil adjacent said flat surface which will have an electrical current induced therein when said battery pack is positioned adjacent said battery charger and said battery charger is energized;

said battery pack including circuit means for utilizing the induced current in said pick-up coil to charge the battery cell in said battery pack;

said circuit means comprising a bridge rectifier electrically connected to said pick-up coil, said bridge rectifier being series connected to each battery cell in said battery pack, said battery pack also including a current limiting resistor imposed in the circuitry between said bridge rectifier and said battery cell in said battery pack.

* * * * *